(12) United States Patent
Kelm et al.

(10) Patent No.: US 9,378,551 B2
(45) Date of Patent: Jun. 28, 2016

(54) METHOD AND SYSTEM FOR LESION CANDIDATE DETECTION

(71) Applicant: SIEMENS AKTIENGESELLSCHAFT, Munich (DE)

(72) Inventors: Michael Kelm, Erlangen (DE); Michael Sühling, Erlangen (DE); Alexey Tsymbal, Erlangen (DE); Michael Wels, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 219 days.

(21) Appl. No.: 14/096,151

(22) Filed: Dec. 4, 2013

(65) Prior Publication Data

US 2014/0185888 A1 Jul. 3, 2014

(30) Foreign Application Priority Data

Jan. 3, 2013 (EP) .................................... 13150105

(51) Int. Cl.
*G06T 7/00* (2006.01)
*G06K 9/62* (2006.01)

(52) U.S. Cl.
CPC ............ *G06T 7/0014* (2013.01); *G06K 9/6282* (2013.01); *G06T 7/0012* (2013.01); *G06K 2209/051* (2013.01); *G06K 2209/055* (2013.01); *G06T 2207/10072* (2013.01); *G06T 2207/20076* (2013.01); *G06T 2207/20081* (2013.01); *G06T 2207/30096* (2013.01)

(58) Field of Classification Search
None
See application file for complete search history.

(56) References Cited

U.S. PATENT DOCUMENTS

| 7,295,691 | B2 | 11/2007 | Uppaluri et al. |
| 7,736,313 | B2 | 6/2010 | Luo et al. |

(Continued)

FOREIGN PATENT DOCUMENTS

| CN | 1504931 A | 6/2004 |
| CN | 101061513 A | 10/2007 |

(Continued)

OTHER PUBLICATIONS

Yoshida et al. "Comparative Performance of Random Forest and Support Vector Machine Classifiers for Detection of Colorectal Lesions in CT Colonography," p. 27-34 in Abdominal Imaging: Computational and Clinical Applications, Third International Workshop, Held in Conjunction with MICCAI 2011, Toronto, Canada, Sep. 18, 2011.*

(Continued)

*Primary Examiner* — Vu Le
*Assistant Examiner* — Alexander J Lesnick
(74) *Attorney, Agent, or Firm* — Harness, Dickey & Pierce, P.L.C.

(57) ABSTRACT

An embodiment of the method is disclosed for non-invasive lesion candidate detection in a patient's body includes generating a number of first medical images of the patient's body. The method further includes identifying lesion-like geometrical regions inside the first medical images of the patient's body by applying image processing methods, whereby the identification is at least partly controlled by a number of patient-specific context features which are not directly extractable from the first medical images. In addition, the method includes selecting a number of the identified lesion-like geometrical regions as lesion candidates.

20 Claims, 5 Drawing Sheets

(56) References Cited

U.S. PATENT DOCUMENTS

| | | |
|---|---|---|
| 2003/0215120 A1 | 11/2003 | Uppaluri et al. |
| 2003/0223627 A1 | 12/2003 | Dachman |
| 2005/0163278 A1* | 7/2005 | Metz .................. A61B 6/032 378/4 |
| 2005/0197567 A1* | 9/2005 | Qian .................. G06T 7/0012 600/425 |
| 2006/0120608 A1 | 6/2006 | Luo et al. |
| 2006/0245629 A1 | 11/2006 | Huo |
| 2007/0110292 A1* | 5/2007 | Bi .................. G06K 9/6256 382/128 |
| 2008/0033291 A1* | 2/2008 | Rousso .............. A61B 5/02755 600/436 |
| 2008/0071711 A1* | 3/2008 | Zhang .................. G06K 9/6257 706/20 |
| 2008/0118124 A1* | 5/2008 | Madabhushi .......... G06K 9/469 382/128 |
| 2008/0201170 A1* | 8/2008 | Canda .................. G06F 19/345 705/2 |
| 2009/0318815 A1* | 12/2009 | Barnes ................ A61B 5/0062 600/473 |
| 2010/0250275 A1* | 9/2010 | Sakagawa ............. G06F 19/321 705/2 |
| 2012/0183193 A1* | 7/2012 | Wels .................... G06K 9/4614 382/131 |
| 2012/0257164 A1* | 10/2012 | Zee .......................... A61B 3/12 351/206 |
| 2013/0030278 A1* | 1/2013 | Seong .................. G06T 7/0012 600/407 |
| 2014/0045713 A1* | 2/2014 | Everett ............... G01N 33/6896 506/9 |

FOREIGN PATENT DOCUMENTS

| | | |
|---|---|---|
| CN | 101742961 A | 6/2010 |
| JP | 2009106530 A | 5/2009 |

OTHER PUBLICATIONS

Chinese Office Action and English translation thereof dated Jul. 9, 2015.

Multi-Stage Osteolytic Spinal Bone Lesion Detection from CT Data with Internal Sensitivity Control, SPIE Medical Imaging, vol. 8315, 2012.

Chinese Office Action dated Mar. 25, 2016, issued in Chinese Patent Application No. 2013107379902.

* cited by examiner

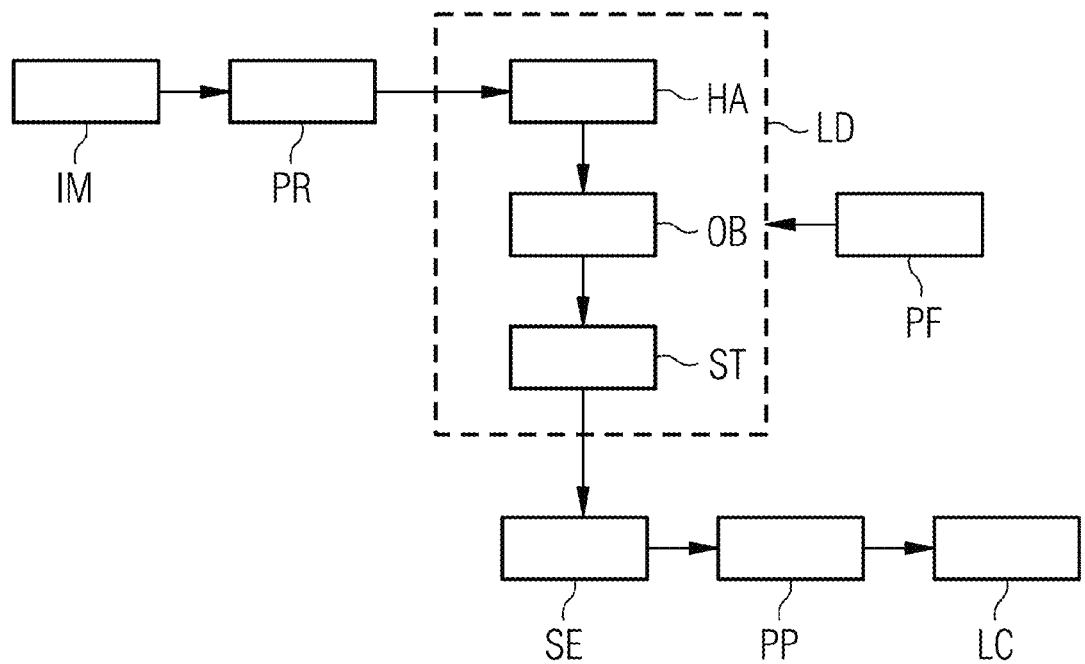
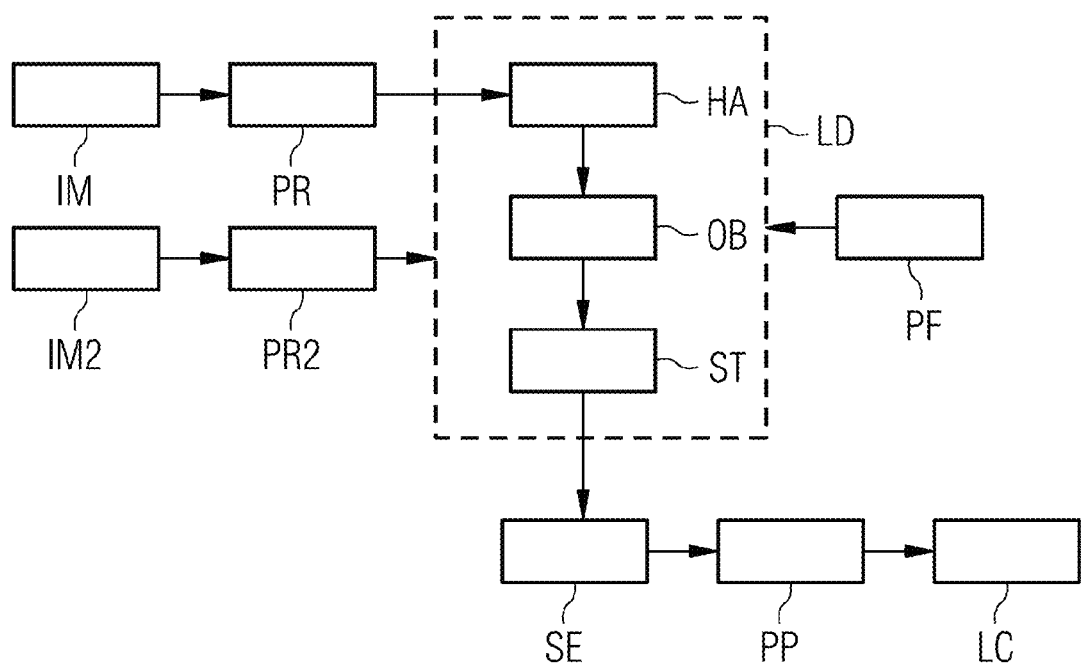

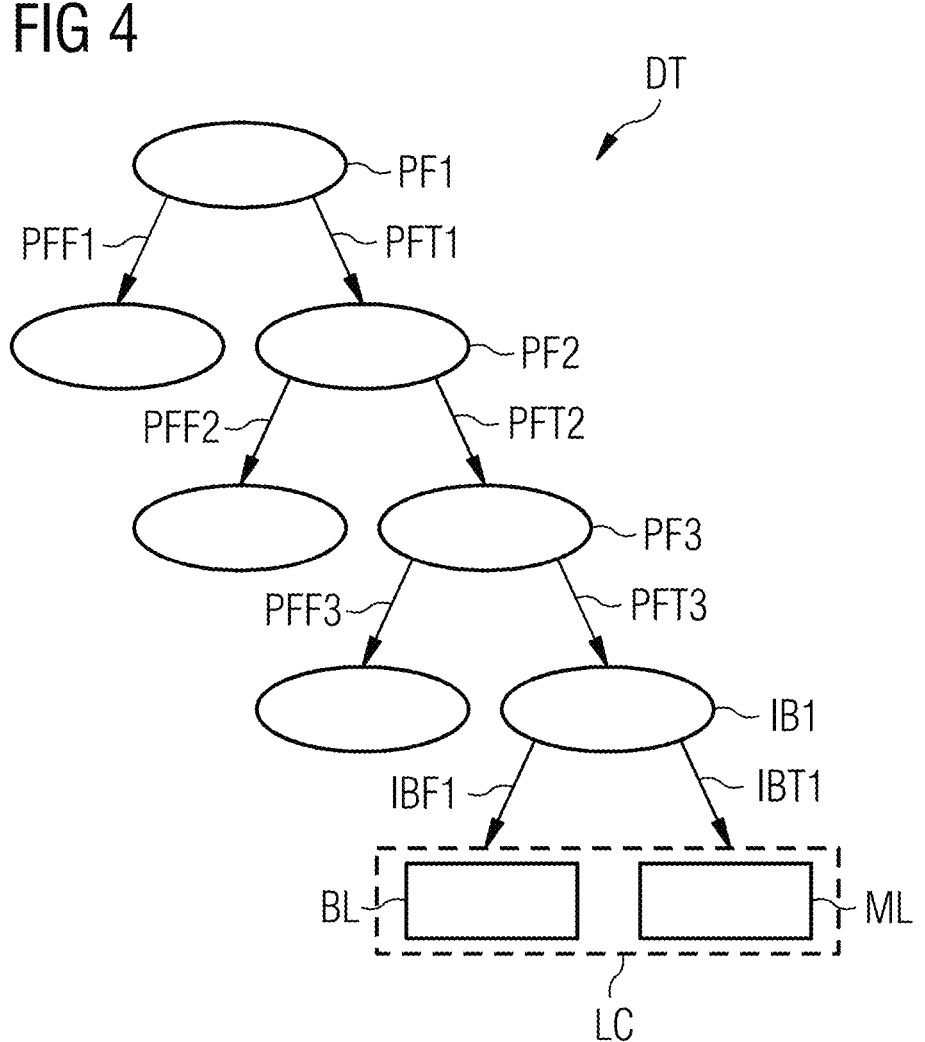

METHOD AND SYSTEM FOR LESION CANDIDATE DETECTION

PRIORITY STATEMENT

The present application hereby claims priority under 35 U.S.C. §119 to European patent application number EP 13150105.8 filed Jan. 3, 2013, the entire contents of which are hereby incorporated herein by reference.

FIELD

At least one embodiment of the invention is generally directed to a method for lesion candidate detection in a patient's body and/or a system for lesion candidate detection in a patient's body.

BACKGROUND

The detection of lesions within a patient's body is an important task during medical examinations, in particular during medical examinations using imaging methods, like computer tomography (CT) or magnetic resonance imaging (MRI). An efficient and accurate detection of lesions supports the success rate of medical screenings and the quality of medical treatments. Especially in the case of cancer screenings and cancer treatments, the detection of lesions inside medical images and their classification as either benign or malign is a obvious and regular but crucial medical task in the daily clinical routine. For example, in the case of bone lesions, a regular analysis of the location, the number and the geometrical dimensions of malign lesions is required to evaluate the progression of metastases and the response of a patient to a certain medical treatment. An accurate analysis enables a successful pain management and can improve the probability of survival for a patient significantly.

Normally, a medical expert who has gained experience in his profession over many years, is performing such a detection by reviewing the medical images of the patient. Hereby, regions of interest are identified by the medical expert and analyzed in detail for any abnormalities which are an indication of benign or malign lesions. Specifically, the medical expert identifies the size, the shape and margin definition of a suspicious region inside a medical image as a basis for his evaluations. However, during a typical medical imaging sequence, a larger number of medical image is taken in many cases. Therefore, the manual analysis by a medical experts becomes a time-consuming activity, also leading to higher medical expenses for those tasks. Furthermore, it is evident that the quality of an analysis performed by experts largely depends on their respective expertise and experience, on the time spent for each analysis and on the scrutiny applied during an analysis. Accordingly, the quality of lesion detection and lesion analysis is characterized by intra- and inter-expert variations.

To address those variations, some proposals to replace or support medical experts by computer-aided detection and analysis techniques have been published already. For example, Wels et al. in "Multi-Stage Osteolytic Spinal Bone Lesion Detection from CT Data with Internal Sensitivity Control", SPIE Medical Imaging, Vol. 8315, 2012 are suggesting a computer-aided detection of lesions located in the spine of a patient. Nevertheless, it is expected that such detection methods are limited and cannot achieve the quality of a detection and analysis of an experienced medical expert since the proposed computer-aided detection techniques are solely based on the medical images.

SUMMARY

At least one embodiment of the invention provides a method and a system for lesion candidate detection in a patient's body which achieves an improved detection and analysis quality.

At least one embodiment of the invention is directed to a method for lesion candidate detection in a patient's body, and at least one embodiment of the invention is directed to a system for lesion candidate detection in a patient's body.

In one step of the method according to at least one embodiment of the invention, a number of first medical images of the patient's body is obtained, for example directly generated or retrieved from a memory. Hereby, and in all subsequent descriptions, "a number" refers to any number larger than "0" and particularly includes the number "1". The medical images applied by the method can be generated by any kind of 2D or 3D medical imaging method or modality. Preferably, a medical imaging modality is applied which is suitable for the type of lesions to be detected. For example, if bone lesions candidates are to be detected, a computer tomography (CT) imaging modality is preferred while a magnetic resonance imaging (MRI) modality is more suited for the detection of lesion candidates within soft tissue or organs.

In another step of the method according to at least one embodiment of the invention, lesion-like geometrical regions inside the first medical images of the patient's body are identified by applying image processing methods, whereby the identification is at least partly controlled by a number of patient-specific context features which are not directly extractable from the medical images. The image processing methods are used to analyze the first medical images and to extract certain features describing the images. Those features can be grouped together in a number of feature vectors. In many cases, computer-aided methods can be applied to generate those features. For example, an imaging processing method could extract a histogram of the frequency of occurrences of a certain attenuation value (e.g. in Hounsfield Units) of a certain radiation intensity (or X-ray intensity). The resulting relative frequency histograms then are applied to identify geometrical regions inside the medical images which are likely to comprise a number of lesions.

In a further step of at least one embodiment of the inventive method, a number of the identified lesion-like geometrical regions is selected as lesion candidates. The selection can be based on certain criteria suitable to select the geometrical regions which have a high probability of being actual lesions of the patient under examination. Those criteria could be for example a certain upper or lower geometrical size limit for an identified geometrical region. For example, the step of selection could only present the lesion-like geometrical regions which are larger than a certain size limit which is typical for a certain type of lesion. However, the step of selecting could also select all lesion-like geometrical regions as lesion candidates.

In summary, in at least one embodiment, a method is provided which advantageously models the typical behavior of an experienced medical expert who would consider not only the medical image data itself while searching for lesion candidates but who would also take into account other patient-specific context features which are not directly extractable from the first image data to direct his search. In particular, the medical expert might know the patient in person or has at least access to the clinical records of the patient which are providing the patient-specific context features. Still, in at least one embodiment, the inventive method can be executed by computer-aided devices thus leading to an implementation of at least one embodiment of the inventive method which could be executed fast and in many cases more efficiently than a manual identification by an experienced medical expert. Furthermore, intra- and inter-expert variations typical for a manual identification of lesion candidates are avoided by computer-aided methods. Consequentially, the method according to at least one embodiment of the invention provides the benefits offered by a manual identification process and the benefits given by computer-aided image processing techniques.

The system for non-invasive lesion candidate detection in a patient's body according to at least one embodiment of the invention comprises an interface unit for interfacing to a number of first medical images of the patient's body. In addition, at least one embodiment of the inventive system includes an identification unit for identifying of lesion-like geometrical regions inside the first medical images of the patient's body by applying image processing methods, whereby the identification is at least partly controlled by a number of patient-specific context features which are not directly extractable from the medical images. Furthermore, at least one embodiment of the inventive system provides a selection unit for selecting a number of the identified lesion-like geometrical regions as lesion candidates.

Major parts of at least one embodiment of the inventive system can preferably be realized as software running on a programmable computer system, as for example a medical image editing station or a diagnosis station. Hence the problem is also solved by a computer program product formed to execute one or more steps of the inventive method, realizing one or more of the components of the inventive system in the form of software, arranged to be run on a respective programmable computer system. It should be noted, that the term "computer system" includes one or more central processing units (CPU), which might be arranged to run various components of the inventive system independently.

Particularly advantageous embodiments and features of the invention are given by the dependent claims, as revealed in the following description. Features of different claim categories may be combined as appropriate to give further embodiments not described herein.

BRIEF DESCRIPTION OF THE DRAWINGS

Other objects and features of the present invention will be-come apparent from the following detailed descriptions considered in conjunction with the accompanying drawings. It is to be understood, however, that the drawings are designed solely for the purposes of illustration and not as a definition of the limits of the invention. The drawings show in FIG. 1 examples of medical images of the spine of a patient's body;

FIG. 2 a flowchart of one embodiment of the method according to the invention;

FIG. 3 a flowchart of an alternative embodiment of the method according to the invention;

FIG. 4 an example of a decision tree designed for realizing a step of the method according to an embodiment of the invention;

DETAILED DESCRIPTION OF THE EXAMPLE EMBODIMENTS

Figure 1:
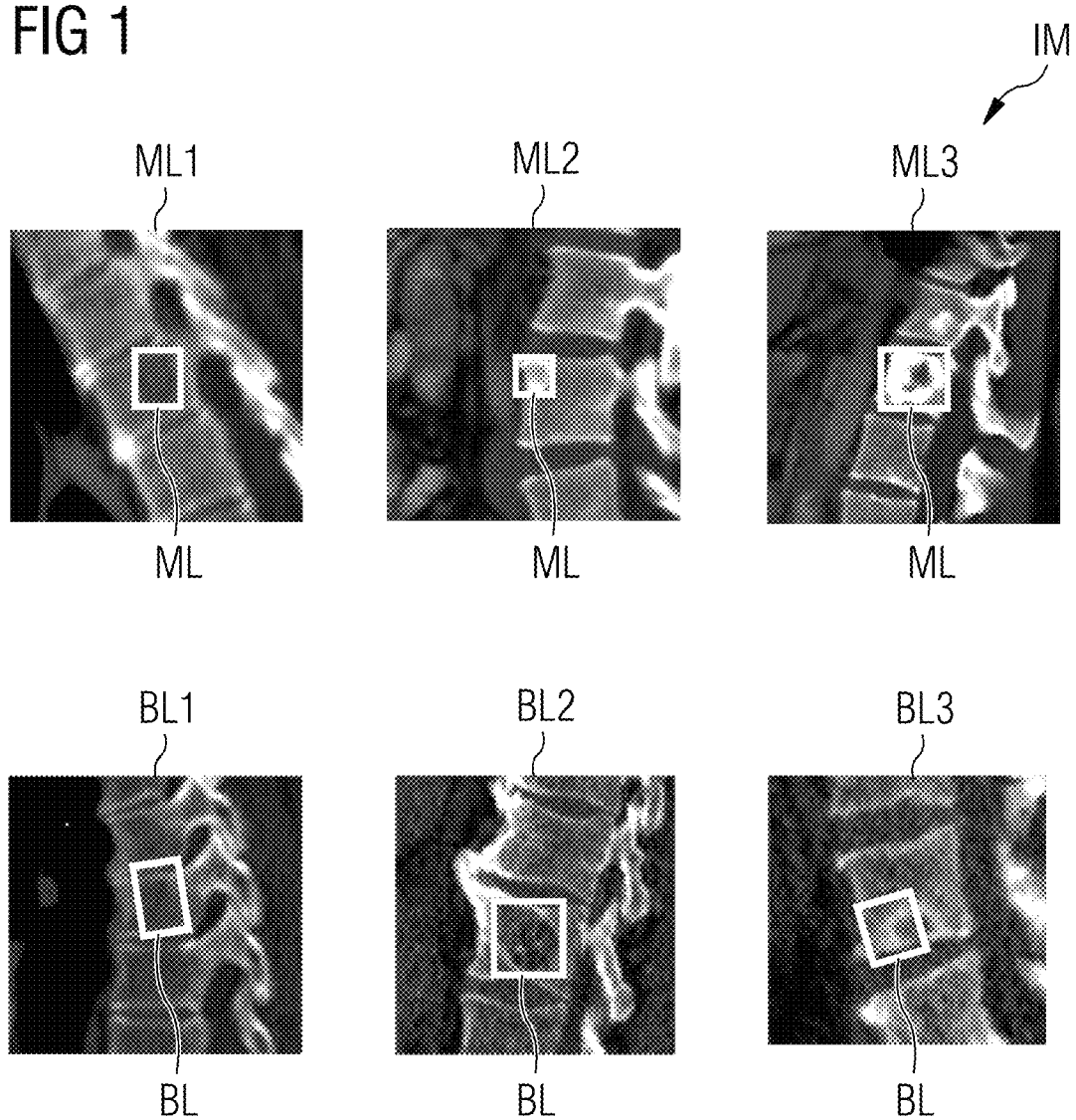

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

At least one embodiment of the invention provides a method and a system for lesion candidate detection in a patient's body which achieves an improved detection and analysis quality.

At least one embodiment of the invention is directed to a method for lesion candidate detection in a patient's body, and at least one embodiment of the invention is directed to a system for lesion candidate detection in a patient's body.

According to at least one embodiment of the invention, a method for lesion candidate detection in a patient's body is provided. The term "lesion" as used in the following specification is summarizing the various kinds of abnormalities that can be found in the body of a patient. Those abnormalities include for example minor or major damages and any other abnormalities in all types of bones (spine, skull, hip, ribs, etc.), organs (lungs, prostate, thyroid, kidney, pancreas, liver, breast, uterus, etc.) and any kind of soft tissue (fat tissue, muscles, skin, nerves, blood vessels, spinal disks, etc.). The term "lesion" is also referring to abnormalities caused by cancerous diseases, like oropharyngeal, adrenal, testicular, cervical, spinal or ovarian tumors as well as tumors or carcinomas located at the skin (melanoma) and in the lungs, prostate, thyroid, kidney, pancreas, liver, breast, uterus, etc.

The detection method is providing "candidates" for lesions as it is obvious to the medical experts in the field that only an invasive technique, like a biopsy and a subsequent analysis of the extracted bone, organ or tissue particle will provide sufficient analysis accuracy allowing to finally judge if the extracted particle (or histological specimen) is a lesion or not. For example, only a medical analysis or histological examination of the particle by specialized experts will provide a final conclusion if an extracted particle is from a lesion at all, and if that lesion is a benign or malign lesion. Nevertheless, using non-invasive techniques to identify lesion candidates is a common and successfully applied technique in the clinical routine, as it can provide a relatively accurate guidance for subsequent invasive treatments. In addition, accurate non-invasive detection techniques can help to avoid unnecessary surgical procedures, for example when the non-invasive method or technique suggests with a high probability that no lesions are present or that there haven't been any relevant changes in the size and number of lesions detected in a previous examination.

It should be appreciated, that the term "patient" is used in its most general sense. Specifically, "patient" also refers to healthy persons that are not suffering from a medical disease, since embodiments of the inventive methods and system can be applied beneficially for many kinds of preventive medical examinations, like a mammography screening. Nevertheless, embodiments of the inventive methods and system are beneficially applicable as well if a patient is affected by a certain medical disease, like cancer. Furthermore, the term "patient" can be extended to many kinds of animals without leaving the scope of the invention, since lesion candidate detection can be of benefit for medical examinations of animals as well. In addition, the term "body" refers to any part of the body of a patient, including its surface or skin and all internal parts, like organs and soft tissue.

In one step of the method according to at least one embodiment of the invention, a number of first medical images of the patient's body is obtained, for example directly generated or retrieved from a memory. Hereby, and in all subsequent descriptions, "a number" refers to any number larger than "0" and particularly includes the number "1". The medical images applied by the method can be generated by any kind of 2D or 3D medical imaging method or modality. Preferably, a medical imaging modality is applied which is suitable for the type of lesions to be detected. For example, if bone lesions candidates are to be detected, a computer tomography (CT) imaging modality is preferred while a magnetic resonance imaging (MRI) modality is more suited for the detection of lesion candidates within soft tissue or organs.

In another step of the method according to at least one embodiment of the invention, lesion-like geometrical regions inside the first medical images of the patient's body are identified by applying image processing methods, whereby the identification is at least partly controlled by a number of patient-specific context features which are not directly extractable from the medical images. The image processing methods are used to analyze the first medical images and to extract certain features describing the images. Those features can be grouped together in a number of feature vectors. In many cases, computer-aided methods can be applied to generate those features. For example, an imaging processing method could extract a histogram of the frequency of occurrences of a certain attenuation value (e.g. in Hounsfield Units) of a certain radiation intensity (or X-ray intensity). The resulting relative frequency histograms then are applied to identify geometrical regions inside the medical images which are likely to comprise a number of lesions.

In addition to image processing methods, the method according to at least one embodiment of the invention applies patient-specific context features to identify lesion-like geometrical regions. Hereby, the patient-specific context features are not readily or directly extractable from the first medical images themselves. However, the patient-specific context features can support the overall quality of the lesion candidate detection. For example, it is known that osteoporosis which is affecting the spinal bones and discs of a patient can lead to abnormalities inside a medical image of the spine. Those abnormalities might be interpreted by a computer-aided image processing method as a malign lesion or carcinoma. Hence, by adding patient-specific context features to the identification step, like for example the knowledge about an existing osteoporosis, the quality of the detection of lesion-like geometrical regions can be improved.

In another beneficial embodiment of the inventive method, the type of a primary cancer is provided as patient-specific context features, since the frequency, the appearance and the location of malign lesions caused by metastases of the primary cancer are largely depending on the type of primary cancer. However, since the primary cancer might be located outside the part of the patient's body under examination, the type of the primary cancer is not directly extractable from the first medical images. Therefore, by providing such patient-specific context features during the inventive step of identifying lesion-like geometrical data, the efficiency and accuracy of the identification can be largely improved since the image processing methods can be adjusted towards the expected frequency, appearance and location of the malign lesions.

In a further step of at least one embodiment of the inventive method, a number of the identified lesion-like geometrical regions is selected as lesion candidates. The selection can be based on certain criteria suitable to select the geometrical regions which have a high probability of being actual lesions of the patient under examination. Those criteria could be for example a certain upper or lower geometrical size limit for an identified geometrical region. For example, the step of selection could only present the lesion-like geometrical regions which are larger than a certain size limit which is typical for a certain type of lesion. However, the step of selecting could also select all lesion-like geometrical regions as lesion candidates.

In summary, a method is provided which advantageously models the typical behavior of an experienced medical expert who would consider not only the medical image data itself while searching for lesion candidates but who would also take into account other patient-specific context features which are not directly extractable from the first image data to direct his search. In particular, the medical expert might know the patient in person or has at least access to the clinical records of the patient which are providing the patient-specific context features. Still, in at least one embodiment, the inventive method can be executed by computer-aided devices thus leading to an implementation of at least one embodiment of the inventive method which could be executed fast and in many cases more efficiently than a manual identification by an experienced medical expert. Furthermore, intra- and inter-expert variations typical for a manual identification of lesion candidates are avoided by computer-aided methods. Consequentially, the method according to at least one embodiment of the invention provides the benefits offered by a manual identification process and the benefits given by computer-aided image processing techniques.

The system for non-invasive lesion candidate detection in a patient's body according to at least one embodiment of the invention comprises an interface unit for interfacing to a number of first medical images of the patient's body. In addition, at least one embodiment of the inventive system includes an identification unit for identifying of lesion-like geometrical regions inside the first medical images of the patient's body by applying image processing methods, whereby the identification is at least partly controlled by a number of patient-specific context features which are not directly extractable from the medical images. Furthermore, at least one embodiment of the inventive system provides a selection unit for selecting a number of the identified lesion-like geometrical regions as lesion candidates.

Major parts of at least one embodiment of the inventive system can preferably be realized as software running on a programmable computer system, as for example a medical image editing station or a diagnosis station. Hence the problem is also solved by a computer program product formed to execute one or more steps of the inventive method, realizing one or more of the components of the inventive system in the form of software, arranged to be run on a respective programmable computer system. It should be noted, that the term "computer system" includes one or more central processing units (CPU), which might be arranged to run various components of the inventive system independently.

Particularly advantageous embodiments and features of the invention are given by the dependent claims, as revealed in the following description. Features of different claim categories may be combined as appropriate to give further embodiments not described herein.

In an advantageous modification of at least one embodiment of the invention, a pre-processing step is added. During this pre-processing step, the number of first medical images of the patient is pre-processed ahead of the step of identifying of lesion-like geometrical regions. Such a pre-processing step can comprise various image processing steps, in particular pre-processing steps which are achieving a standardization or normalization to certain co-ordinate systems or to certain pre-defined scales. Furthermore, the pre-processing step can provide a spatial constraint of the search range for lesion candidates, providing a more efficient and accurate execution of the inventive methods and systems. Preferably, the pre-processing step is performed by computer-aided means in an automatic or semi-automatic manner.

In another advantageous modification of at least one embodiment of the invention, a post-processing step is added. During this post-processing step, the geometrical location and dimensions of the identified lesion candidates are modified by various image processing steps, in particular post-processing steps which are translating the geometrical location and dimensions of the identified lesion candidates given within a standardized and scaled co-ordinate system back into the original co-ordinate system and the original scale of the first medical images of the patient's body. In addition, lesion candidates being located close to each other could be merged together, as they are in many cases likely to represent the same physical lesion. I.e. lesion candidate detection results which are considered to be redundant are removed by agglomerative clustering. Preferably, the post-processing step is performed by computer-aided means in an automatic or semi-automatic manner.

In a preferred embodiment of the invention, the identifying of lesion-like geometrical regions uses a number of sub-detectors which are applied to the first medical images, whereby at least one sub-detector is controlled by at least one of the patient-specific context features. Such sub-detectors are providing specific image processing features to select lesion-like geometrical regions within the medical images. For example, one sub-detector could be designed to provide a selection of lesion-like geometrical regions by calculating and evaluating 3D Haar-like features. 3D Haar-like features are commonly used descriptors for object detection in medical images, such as detection of lesion candidate centers. Haar-like features are representing a set of weak descriptors generated with a specified basis set of image masks via summing or subtracting image intensities. Thus, each Haar-like feature describes intensity distribution according to the pattern of the corresponding mask in a certain region. The resulting feature vectors are usually large, often exceeding 10,000 elements. Hereby, a selection can be based on a pre-defined threshold of a probabilistic output of each sub-detector. For example, knowing that the primary tumor is located in kidney or in thyroid, the likelihood output for the sub-detector to detect a lytic lesion can be increased while the likelihood for the sub-detector to detect a blastic lysion can be decreased since primary tumors located in a kidney or a thyroid are known to be more likely to cause lytic rather than blastic lesions. Accordingly, the lesion candidate detection or prediction becomes patient-specific.

That means that a patient-specific context feature like the type of a primary tumor or the fact that the patient suffers from osteoporosis can be beneficially applied to control such a threshold level thereby in turn providing more accurate results during the lesion candidate detection.

Preferably, the sub-detectors are selected from a group of sub-detectors using image voxel intensities, sub-detectors using image moments, sub-detectors using haar-like image features, sub-detectors using steerable image features, sub-detectors using objectness image features. Image moments are classical image descriptors, which describe the distribution of voxel intensities based on the weighted average of them or them raised to a certain power, the so-called moments. Image moments are similar to commonly used statistical moments, such as mean, variance, skewness and kurtosis, except that they are calculated for 2D or 3D matrices, i.e. image data.

Image moments normally possess valuable properties for lesion candidate detection and are robust descriptors of image texture. Particularly useful image moments are those which are invariant under translation, rotation and scale, like the so-called Hu moments. Steerable image features are features introduced by Siemens Corporate Research. They incorporate the orientation and scale information into the distribution of image sampling points, thereby avoiding time-consuming volume data rotation operations, normally used to generate alternative rotation and scale candidates. Objectness features track blobness, vesselness and planeness in the image of the patient's body. They are valuable descriptors for lesion candidates, since information about blobness, vesselness and planeness of a lesion is clinically important in many contexts, such as diagnosing malignancy. Each objectness feature reflects how much the neighborhood surrounding each voxel resembles a certain object i.e. a blob, a vessel or a plane. Objectness features can be calculated through a Hessian matrix, including local secondorder derivatives of the image intensity.

In an alternative preferred embodiment, a sub-detector is configured to using a plurality of image features and at least one of the patient-specific context features to identify the lesion-like geometrical regions. In a particularly preferred embodiment, all image features available for lesion identification are used by a single sub-detector. The image features extractable from the first medical images can comprise for example image voxel intensities, image moments, Haar-like image features (like coarse or fine 3D Haar-like features), steerable image features and objectness image features.

In another preferred embodiment of the invention at least one sub-detector has been trained by medical image training data annotated with a number of patient-specific context features, preferably by medical image training data of patients with lesions and by medical image training data of patients without lesions. For example, within previous medical examinations, previous medical images have been obtained with confirmed locations of lesions within a first group of the previous medical images and with a confirmed absence of lesions within a second group of the previous medical images. For both groups, a number of patient-specific context features, like the primary type of a tumor or certain medical conditions, like osteoporosis are provided. Those previous medical images are then used to train a sub-detector, preferably by methods of machine-learning, to identify lesion-like geometrical regions within medical images as a function of the patient-specific context features. The trained sub-detectors can be re-trained by including new medical image training data, preferably in a regular manner, for example in predetermined intervals.

In a further preferred embodiment of the invention, a cascade of a plurality of sub-detectors is used for the identification of lesion-like geometrical regions, whereby the sub-detectors are applied sequentially such that the output data of a first sub-detector is applied as input data to a second sub-detector.

In a particularly preferred embodiment of the invention at least one of the number of sub-detectors is applying a number of decision trees, preferably a number of random decision forests (e.g., RANDOM FORESTS) or other rule-based techniques. Favorably, at least one of the decision trees comprises decisions which are based on at least one of the number of patient-specific context features. Decision trees are known to be suitable for heterogeneous input data. Hence, they are particularly suited for the detection of lesion candidates according to at least one embodiment of the invention since the invention is based on the beneficial combination of medical images, often represented by real values, and patient-specific context features, often represented by categorical data, like the type of a primary tumor. Specifically, decisions trees, rule-based techniques and random decision forests are well suited for processing a plurality of image features, like image voxel intensities, image moments, Haar-like image features (like coarse or fine 3D Haar-like features), steerable image features and objectness image features.

Furthermore, decision trees are known to be robust against missing data values. I.e. if a data value is missing at a decision node of a decision tree, the decision tree is traversed in multiple paths instead of a single path. Thus, instead of one, multiple tree leaves are reached, decisions from which are then combined, accounting for the likelihood of reaching the leaf. The same concerns random decision forests, where instead of having one decision per component tree and combining them via voting or via weighted or non-weighted averaging in regression, in case of the presence of missing data, simply more decisions are combined, each corresponding to a leaf reached while traversing the tree. Accordingly, decision trees and random decision forests are suited for an application within a sub-detector, since not all possible patient-specific context features might be known during the lesion candidate detection. For example, it might be unknown for a specific patient if that patient suffers from osteoporosis. Still, by applying decision trees or random decision forests, the inventive method and system would be able to perform the lesion candidate detection successfully.

Decision trees and random decision forests applied within sub-detectors are preferably characterized in that decisions which are based on patient-specific context features are arranged closer to the root node of a decision tree than decisions which are based on the first medical images. Hereby, an efficient execution of at least one embodiment of the inventive method is provided since decisions which are relatively easy to evaluate are executed ahead of decisions requiring more complex image processing. In addition, the number of features derived from the first medical images can be considerably greater than the number of patient-specific context features. For example, the number of 3D Haar-like features to be used in sub-detectors is often greater than 10,000 or even 100,000.

Accordingly, by arranging the decisions based on patient-specific features closer to the root node of a decision tree, it can be avoided that the evaluation of a decision tree or random forest will is dominated by the large number of features derived from the medical images. A similar beneficial effect is obtained by a further preferred embodiment of the invention which is characterized in that the decision trees provide a higher probability of selection for the patient-specific context features than features which are based on the first medical images.

In another preferred embodiment of the invention, the number of sub-detectors is arranged such that each sub-detector is assigned unambiguously to specific values of a patient-specific context feature. For example, two separate sub-detectors are provided, one sub-detector for patients suffering from osteoporosis and another sub-detector for patients who are not suffering from osteoporosis. Hereby, a higher quality or better predictive performance is achieved, due to the reduction of the problem complexity and the generation of a more patient-specific detection method. In addition, the speed of execution is an advantage, which can be important in particular situations, where a real-time, or a near real-time decision is necessary. This includes also automatically executed lesion candidate detection methods, where the amount of lesion candidate voxels to be evaluated is large and the question of speed of execution is important, if for example delaying the work of an radiology expert is not desirable. The influence of this preferred embodiment on the speed of execution is indirect, via reduced complexity of the problem and simpler detection methods being generated e.g., by more concise decision trees.

Preferably, the method and system according to at least one embodiment of the invention are applied to detecting bone lesion candidates, particularly preferably are applied to detecting spinal bone lesion candidates. Spinal bone lesions are known for potentially causing severe pain, hypercalcemia, pathological fractures and neurological impairment. However, their detection is challenging since malign bone lesions depicted inside medical images can be easily confused with other abnormalities, like osteoporosis or hemangioma.

The first medical images for embodiments of the inventive methods and system are provided by medical imaging devices for 2D or 3D imaging, preferably from a group comprising X-ray imaging, computer tomography (CT), infrared radiation (IR) imaging, positron emission tomography (PET), magnetic resonance imaging (MRI), functional magnetic resonance imaging (fMRI), and sonographic imaging.

The patient-specific context features might be selected from a group comprising: gender, age, familial history, clinical history, history of appointments, diagnoses, prescriptions, and further controllable and uncontrollable risk factors. Controllable risk factors can be, at least to some extent, controlled by the patient. Examples of these include weight, smoking or being around others who smoke, alcohol consumption, dietary habits, as well as lifestyle factors such as sexual behavior and exercising activities. Risk factors which cannot be controlled by the patient include race, genetics, and medical conditions such as a chronic infection with Hepatitis B or Hepatitis C.

In a further preferred embodiment, the first medical images of the patient's body are generated with a first medical imaging method and the patient-specific context features (which are not directly extractable from the first medical images) comprise features which are derived at least partly based on previous medical images of the patient's body which were generated with a second medical imaging method. In other words, in this method for non-invasive lesion candidate detection in a patient's body, a number of first medical images of the patient's body with a first medical imaging method are generated in accordance with the previous description. In a further step of this method, lesion-like geometrical regions inside the medical images of the patient's body are identified by applying image processing methods, whereby the identification is at least partly controlled by previous medical images of the patient's body which were generated with a second medical imaging method.

Another step of this method selects a number of the identified lesion-like geometrical regions as lesion candidates in accordance with the description of the previous method. This amounts to another beneficial method for lesion candidate detection since medical images of the same patient obtained previously with a different imaging method or modality are applied to improve the quality and accuracy of lesion candidate detection. For example, previous image data generated by an MRI modality could provide information about a primary type of cancer inside the soft tissue of a patient. A subsequent bone lesion candidate detection applying medical images from a CT imaging modality can be guided by the findings on the primary type of cancer obtained with an MRI modality, since frequency, appearance and location of malign lesions or metastases is often strongly dependent on the primary type of cancer.

In addition, the primary type of cancer could be known from other medical methods, for example from a previous biopsy and tissue analysis. Still, in accordance with at least one embodiment of the invention, this information could be provided by the patient-specific context features and be applied during the lesion candidate detection. In particular, patient-specific context features could be obtained or extracted from medical records available for the patient.

Further, other patient-specific context features which are not directly extractable from the first or previous medical images may be combined with data from a second medical imaging method. For example, the patient-specific context features could comprise information about an osteoporosis, while the second medical imaging method, e.g. based on MRI, provides information about a primary tumor located in the soft tissue of the patient. Consequently, a lesion candidate detection within medical images obtained with a CT imaging modality can be guided by the information about the osteoporosis and the characteristics of the primary tumor.

In another preferred embodiment, the first medical images are medical images of a first portion of the patient's body, and the patient-specific context features (which are not directly extractable from the first medical images) comprises features which are derived at least partly based on previous medical images of a second portion of the patient's body which is not identical to the first portion of the patient's body. In other words, in this method for non-invasive lesion candidate detection in a patient's body a number of medical images of a first portion of the patient's body are generated in accordance with the previous description.

In a further step of this method lesion-like geometrical regions inside the medical images of the patient's body are identified by applying image processing methods, whereby the identification is at least partly controlled by previous medical images of a second portion of the patient's body which is not identical to the first portion of the patient's body. Another step of this method selects a number of the identified lesion-like geometrical regions as lesion candidates in accordance with the previous description of at least one embodiment of the inventive methods.

In summary, at least one embodiment of the inventive method is contributing to the quality and accuracy of lesion candidate detection since findings on the medical conditions of other physical regions of the patient can beneficially guide a lesion candidate detection. As an example, it is known to medical experts, that a primary tumor inside a kidney or inside the thyroid often causes spinal metastases having a lytic appearance. By extracting such information from medical images of a second portion of the patient's body and feeding such information into the lesion candidate detection of a first portion of the patient's body, the quality and accuracy of the lesion candidate detection can be improved, for example by narrowing the lesion-like geometrical region identification to lesions with lytic appearance.

Further, the accuracy and efficiency of the lesion candidate detection method may be enhanced, if patient-specific context features which are not directly extractable from the first medical images or previous medical images of the second portion of the patient's body are combined with data from a second portion of the patient's body.

Preferably, the method according to at least one embodiment of the invention is performed in an automatic or semi-automatic manner. In particular, the patient-specific context feature might be provided in a manual manner by an operator or a medical expert, while at least a larger portion of the image processing is executed in an automatic manner.

Although the invention is described mainly by embodiments representing a so called Content Based Image Retrieval (CBIR) system to support clinical decisions, such embodiments are solely illustrative and are not intended to limit the invention.

FIG. 1 shows examples of medical images IM of the spine of a patient's body. Hereby, the upper three images ML1, ML2 and ML3 are showing examples of a spine with malign lesions ML. The regions comprising the malign lesions ML are marked by a rectangle in each of the images ML1, ML2 and ML3. Furthermore, FIG. 1 depicts three images BL1, BL2 and BL3 which are showing benign lesions BL which are marked by a respective rectangle in each of the images BL1, BL2 and BL3. In particular, ML1 is showing a lytic lesion, ML2 a blastic lesion and ML3 a malign lesion ML affecting the whole body while BL1 is showing a benign lesion BL caused by osteoporosis, BL2 is showing a benign lesion BL caused by a hemangioma and BL3 is showing a benign lesion BL caused by a schmorl node. Obviously, benign lesions BL and malign lesions ML exhibit relatively similar characteristics within the medical images IM. Consequently, there is a need for methods and systems supporting an accurate and efficient detection and classification of lesions within medical images IM, such as the methods and system according to the invention.

FIG. 2 illustrates a flowchart of one embodiment of the method according to the invention. A number of first medical images IM is provided to a pre-processing step PR which could for example perform various image processing steps, in particular steps which are achieving a standardization or normalization to certain co-ordinate systems or to certain predefined scales. The output of the pre-processing step PR is provided to the lesion-like region detection LD consisting of three cascaded sub-detectors HA, OB, ST. The first sub-detector HA evaluates the pre-processed images and calculates coarse 3D Haar-like features and separates the image voxels into voxels which are not expected to represent a lesion and those which are expected to represent a lesion. The latter group is provided to a subsequent sub-detector OB which realizes an additional discrimination of the regions or voxels expected to represent lesions by evaluating objectness features. The output of the detector OB is provided to a third sub-detector ST which evaluates steerable image features to achieve a further refinement of the regions or voxels potentially representing lesions. The lesion-like region detection LD is controlled by patient-specific context features PF to improve the efficiency, quality and accuracy of the lesion-like region detection LD.

In particular, certain patient-specific context features PF could be applied to control the behavior of one or more than one sub-detector HA, OB, ST. For example, a threshold for selecting 3D Haar-like features within the number of first medical images IM could be defined by certain values of a number of patient-specific context features PF. Other methods of image processing or additional sub-detectors might be applied even if not mentioned here. For example, a sub-detector which is based on the calculation and evaluation of fine 3D Haar-like features might be applied in addition. The output of the lesion-like region detection LD is provided to a selection step SE which selects lesion candidates, for example by a certain upper or lower geometrical size limit for an identified geometrical region. For example, the selection step SE could only present the lesion-like geometrical regions which are larger than a certain size limit which is typical for a certain type of lesion. However, the selecting step SE could also select all lesion-like geometrical regions as lesion candidates. Finally, a post-processing step PP modifies the characteristics of the lesion candidates LC by various image processing steps, in particular by post-processing steps PP which are translating the geometrical location and dimensions of the identified lesion candidates given within a standardized and scaled co-ordinate system back into the original co-ordinate system and the original scale of the number of first medical images IM of the patient's body. In addition, lesion candidates LC being located close to each other could be merged together by the post-processing step PP, as they are in many cases likely to represent the same physical lesion. I.e. lesion candidate detection results which are considered to be redundant are removed for example by agglomerative clustering.

While FIG. 2 has shown a preferred embodiment of the invention by applying sub-detectors which are specifically using one image feature, an alternative preferred embodiment of the invention which is not shown in FIG. 2 comprises a sub-detector which is configured to using a plurality of image features and at least one of the patient-specific context features to identify the lesion-like geometrical regions. In a particularly preferred embodiment, all image features available for lesion identification are used by a single sub-detector.

FIG. 3 shows a flowchart of an alternative embodiment of the method according to the invention. Here, in contrast to FIG. 2, the lesion-like region detection LD is also controlled by additional medical images IM2 of the same patient. Those medical images IM2 could represent other parts of the patient's body. Furthermore, the medical images IM2 could be provided by an imaging modality which is different from the one used to generate the number of first medical images IM. A pre-processing step PR2 can be used to modify the medical images IM2, preferably by computer-aided image processing methods.

FIG. 4 depicts an example of a decision tree designed for realizing a step of the method according to the invention. Patient-specific context features PF1, PF2, PF3 are evaluated ahead of an image based feature IB1 providing the benefits outlined earlier. If the evaluation of a patient-specific context feature PF1, PF2, PF3 indicates a true result, the decision path continues along the respective PFT1, PFT2, PFT3 arrow of the decision tree DT. Correspondingly, if the evaluation of a patient-specific context feature PF1, PF2, PF3 indicates a false result, the decision path continues along the respective PFF1, PFF2, PFF3 arrow of the decision tree DT. In a similar fashion, decisions relying on image based features IB1 can yield a true result IBT1 or a false result IBF1. As an example, PF1 could be the gender of the patient and the PFT1 arrow could correspond to a male patient, while the PFF1 arrow corresponds to a female patient.

Another patient-specific context feature PF2 could be the age of the patient and the PFT2 arrow could correspond to a patient with an age above 60 years while the PFF2 arrow corresponds to an age of 60 or below. A further patient-specific context feature PF3 might describe for example if the patient suffers from osteoporosis. Hereby, a PFT3 arrow could correspond to a patient not suffering from osteoporosis while the PFF3 arrow is valid for patients who have got osteoporosis. After the patient-specific context features PF1, PF2, PF3 have been evaluated, an image-based feature IB1 is evaluated. Here, for example, an IBT1 arrow could correspond to features which are characterized by 3D Haar-like feature above a certain threshold value while the IBF1 arrow corresponds to 3D Haar-like image features at or below a certain threshold value. As a result of this final evaluation, lesions candidates LC are classified into malign lesions ML and benign lesions BL. It has to be noted that the example of a decision tree DT within FIG. 4 is largely simplified for the sake of clarity. Decision trees DT according to the invention which are used during clinical examinations are expected to consist of around 10 to 20 decision levels. Especially, the final selection of lesion candidates LC will be based on more than one image based feature IB1.

Figure 5:
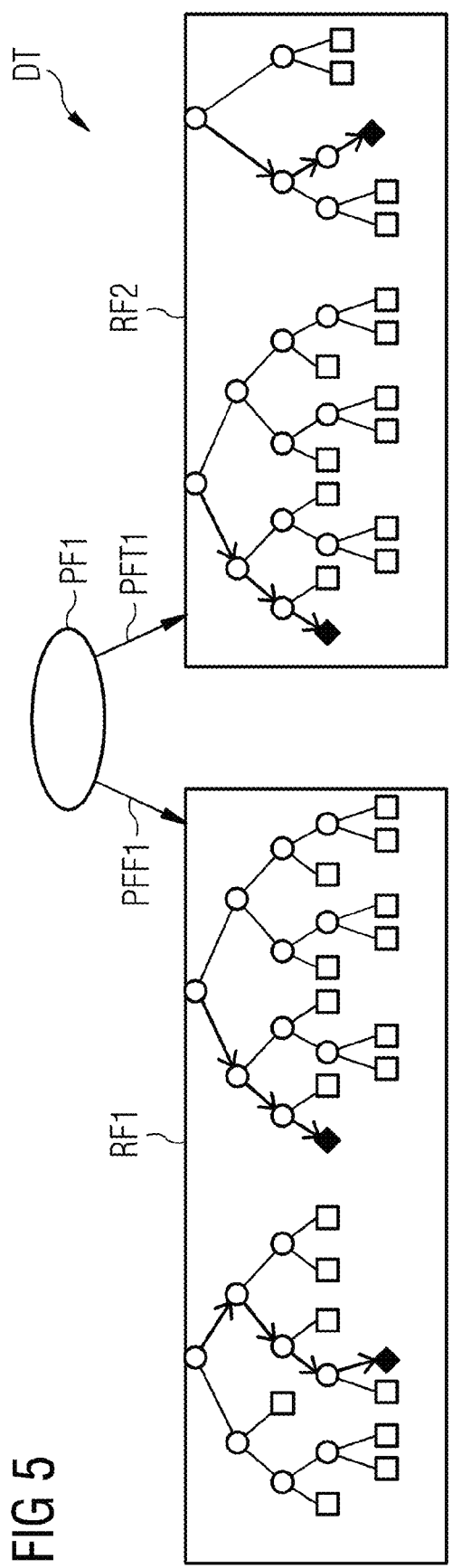
FIG. 5 another example of a decision tree designed for realizing a step of the method according to an embodiment of the invention.

FIG. 5 illustrates another example of a decision tree DT designed for realizing a step of the method according to an embodiment of the invention. Here, a patient-specific context feature PF1 is again located beneficially at the root of the decision tree DT. Depending on the evaluation result for the patient-specific context feature PF1, either the true arrow PFT1 or the false arrow PFF1 is activated. As can be seen in FIG. 5, the subsequent lesion candidate detection applies random-forests RF1, RF2, whereby the random forest RF1 and RF2 are different, i.e. they are depending on the value of the patient-specific context feature PF1, so that a specific random forest RF1, RF2 is applied for the lesion candidate detection. For example, if two separate random decision forests RF1, RF2 are provided, one random forest RF1 could be used for patients suffering from osteoporosis and another random forest RF2 for patients who are not suffering from osteoporosis. Hereby, a higher quality or better predictive performance is achieved, due to the reduction of the problem complexity and the generation of a more patient-specific random-forest based detection method. In addition, the speed of execution is an advantage of this embodiment.

Figure 6:
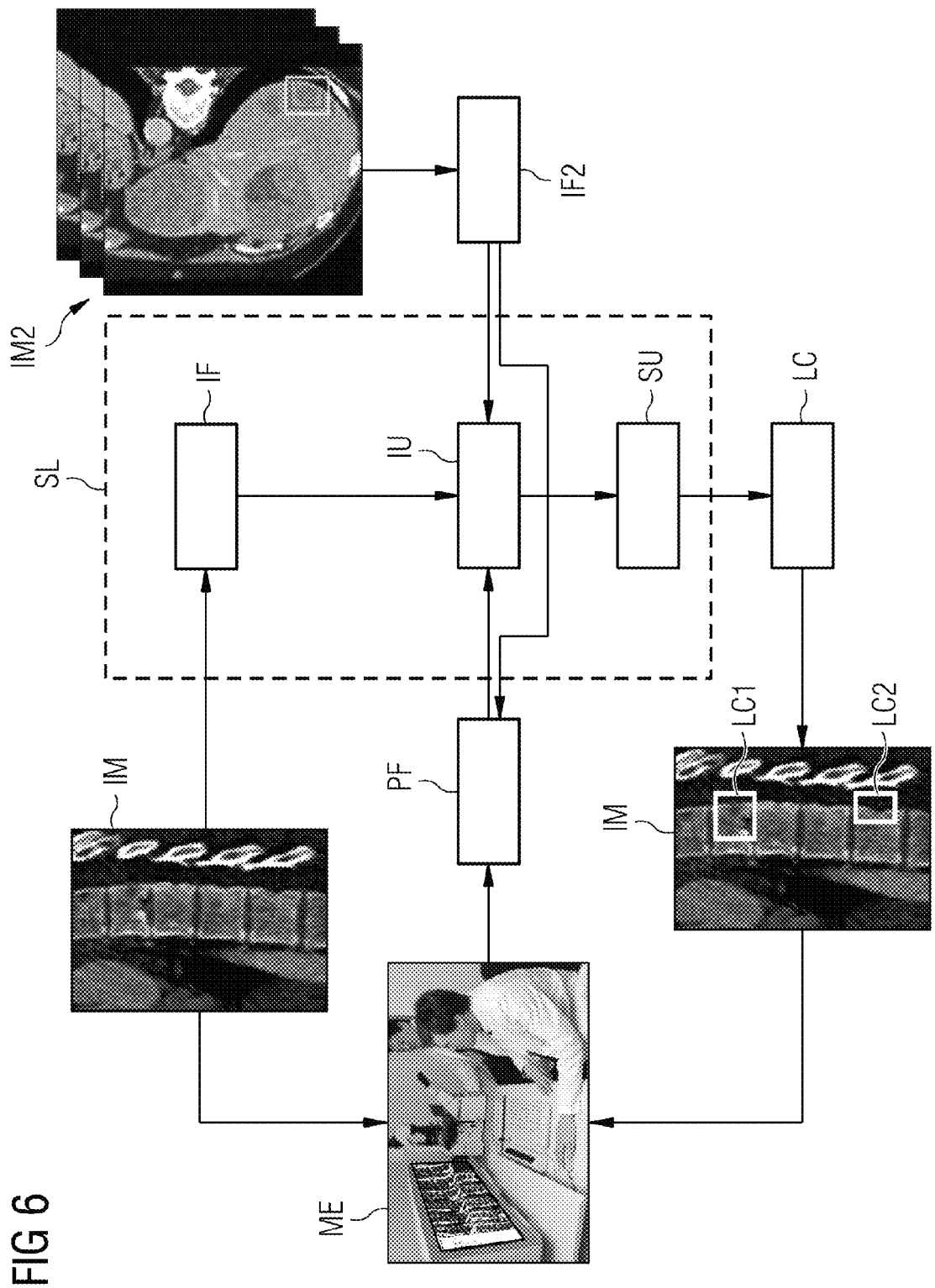
FIG. 6 a schematic overview of an embodiment of the system according to an embodiment of the invention.

With FIG. 6, a schematic overview of an embodiment of the system for non-invasive lesion candidate detection SL according to the invention is shown. A number of first medical images IM of the spine of a patient's body is provided to an interface unit IF for reading a number of first medical images IM of the patient's body. An identification unit IU is applied for identifying lesion-like geometrical regions inside the first medical image IM of the patient's body by applying image processing methods, whereby the identification is at least partly controlled by a number of patient-specific context features PF which are not directly extractable from the first medical images IM. This control of the identification can be established in a direct manner or indirectly by controlling the patient-specific context features PF. In addition, further medical images IM2 are provided which could represent other parts of the patient's body or could be provided by an imaging modality which is different from the one used to generate the first medical images IM. Here, the medical images IM2 are showing certain regions of the liver of the patient with a primary tumor marked by a rectangle. Thus, valuable information is available via the interface IF2 to beneficially control the number of patient-specific context features PF. A selection unit SU is applied for selecting a number of the identified lesion-like geometrical regions as lesion candidates LC, highlighted by rectangles LC1 and LC2 in the number of first medical images IM. Medical experts ME are controlling the system for non-invasive lesion candidate detection SL and are reviewing the results generated. In addition, the medical experts ME can enter patient-specific context features PF to improve the quality of the lesion candidate detection.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements.

What is claimed is:

1. A method for non-invasive lesion candidate selection in a patient's body, the method comprising:
   obtaining a number of first medical images of the patient's body;
   identifying lesion-like geometrical regions inside the first medical images of the patient's body by applying image processing methods and based on at least one of pixel and voxel characteristics of the first medical images, wherein the identifying is at least partly controlled by a number of patient-specific context features which are not directly extractable from the first medical images;
   selecting a number of the identified lesion-like geometrical regions as lesion candidates;
   wherein the identifying lesion-like geometrical regions includes applying a number of random decision trees, at least one of the random decision trees including decisions that are based on at least one of the patient-specific context features; and
   wherein the decisions based on the at least one of the patient-specific context features are arranged relatively closer to a root node of the at least one of the random decision trees than decisions based on the first medical images.

2. The method of claim 1, wherein
   the identifying of lesion-like geometrical regions uses a number of sub-detectors applied to the first medical images; and
   at least one of the sub-detectors is controlled by at least one of the patient-specific context features.

3. The method of claim 2, wherein the number of sub-detectors is selected from a group including
   sub-detectors using image voxel intensities,
   sub-detectors using image moments,
   sub-detectors using haar-like image features,
   sub-detectors using steerable image features, and
   sub-detectors using objectness image features.

4. The method of claim 3, wherein the at least one of the sub-detectors has been trained by medical image training data annotated with a number of patient-specific context features.

5. The method of claim 4, wherein the at least one of the sub-detectors has been trained by medical image training data of patients with lesions and by medical image training data of patients without lesions.

6. The method of claim 2, wherein the at least one of the sub-detectors has been trained by medical image training data annotated with at least one of the patient-specific context features.

7. The method of claim 6, wherein the at least one of the sub-detectors has been trained by medical image training data of patients with lesions and by medical image training data of patients without lesions.

8. The method of claim 2, wherein
the identifying of lesion-like geometrical regions uses a cascade of a plurality of sub-detectors; and
the plurality of sub-detectors are applied sequentially such that output data of a first of the plurality of sub-detectors is applied as input data to a second of the plurality of sub-detectors.

9. The method of claim 2, wherein each sub-detector, among the number of sub-detectors, is assigned unambiguously to specific values of a patient-specific context feature.

10. A method of claim 2, wherein the at least one of the sub-detectors applies a number of random decision forests.

11. The method of claim 2, wherein
the random decision trees provide a relatively higher probability of selection for the patient-specific context features than features based on the first medical images.

12. The method of claim 2, wherein
the number of first medical images are generated with a first medical imaging method and
the number of patient-specific context features include features derived at least partly based on previous medical images of the patient's body generated with a second medical imaging method.

13. The method of claim 1, wherein the random decision trees provide a relatively higher probability of selection for the patient-specific context features than features based on the first medical images.

14. The method of claim 1, wherein the method is applied to detecting bone lesion candidates.

15. The method of claim 1, wherein the at least one of the patient-specific context features is selected from a group including gender, age, familial history, clinical history, history of appointments, diagnoses, prescriptions, controllable risk factors, and uncontrollable risk factors.

16. The method of claim 1, wherein the number of first medical images are generated with a first medical imaging method; and
the patient-specific context features include features derived at least partly based on previous medical images of the patient's body generated with a second medical imaging method.

17. The method of claim 1, wherein
the number of first medical images are medical images of a first portion of the patient's body; and
the patient-specific context features include features derived at least partly based on previous medical images of a second portion of the patient's body, the second portion of the patient's body being different from the first portion of the patient's body.

18. The method of claim 1, wherein the method is applied to detecting spinal bone lesion candidates.

19. A system for non-invasive lesion candidate detection in a patient's body, the system comprising:
a processor configured to execute computer-readable instructions to
read a number of first medical images of the patient's body;
identify lesion-like geometrical regions inside the first medical images of the patient's body by applying image processing methods and based on at least one of pixel and voxel characteristics of the first medical images, wherein the identification is at least partly controlled by a number of patient-specific context features that are not directly extractable from the first medical images; and
select a number of the identified lesion-like geometrical regions as lesion candidates;
wherein the processor is further configured to execute computer-readable instructions to identify the lesion-like geometrical regions by applying a number of random decision trees, at least one of the random decision trees including decisions that are based on at least one of the patient-specific context features; and
wherein the decisions based on the at least one of the patient-specific context features are arranged relatively closer to a root node of the at least one of the random decision trees than decisions based on the first medical images.

20. The system of claim 19, wherein
the processor is further configured to execute computer readable instructions to identify lesion-like geometrical regions using a number of sub-detectors applied to the medical images; and
at least one of the sub-detectors is controlled by at least one of the patient-specific context features.

* * * * *